United States Patent [19]
Moreno

[11] Patent Number: 5,118,255
[45] Date of Patent: Jun. 2, 1992

[54] MOTOR

[76] Inventor: Angel Moreno, 5945 Avenue Panama, Brossard, Canada, J4W 2G4

[21] Appl. No.: 503,800

[22] Filed: Apr. 3, 1990

[51] Int. Cl.[5] ............................................. F03D 3/06
[52] U.S. Cl. .................................. 416/117; 416/132 B; 416/140
[58] Field of Search ................... 416/18, 98, 107, 131, 416/132 B, 135, 140, 17, 117; 415/2.1, 4.1, 4.2, 4.4, 905, 907

[56] References Cited

U.S. PATENT DOCUMENTS

| | | | |
|---|---|---|---|
| 16,818 | 3/1857 | Wilson | 416/132 B X |
| 17,168 | 4/1857 | Nutting | 416/117 |
| 377,602 | 2/1888 | Cooper | 415/2.1 |
| 665,891 | 1/1901 | Fetty | 416/117 |
| 1,296,082 | 3/1919 | Huber | 416/132 B |
| 1,447,686 | 3/1923 | Oswald | . |
| 1,930,390 | 10/1933 | Jacobs | 416/135 A |
| 2,247,929 | 7/1941 | Terhune | 416/139 |
| 2,406,268 | 8/1943 | Terhune | 416/139 |
| 4,142,832 | 3/1979 | Clifton | 416/117 |
| 4,247,251 | 1/1981 | Wuenscher | 416/132 B X |
| 4,310,284 | 1/1982 | Randolph | 416/132 B |
| 4,421,458 | 12/1983 | Allan et al. | 416/132 B X |
| 4,684,817 | 8/1987 | Goldwater | 416/132 B X |

FOREIGN PATENT DOCUMENTS

| | | | |
|---|---|---|---|
| 144591 | 2/1936 | Australia | 416/132 B |
| 851175 | 10/1952 | Fed. Rep. of Germany | 416/131 R |
| 1121478 | 1/1962 | Fed. Rep. of Germany | 416/98 |
| 988883 | 9/1951 | France | 416/132 B |
| 2289767 | 5/1976 | France | . |
| 2298706 | 8/1976 | France | . |
| 40378 | 12/1957 | Poland | 416/132 B |
| 532191 | 2/1973 | Switzerland | . |

OTHER PUBLICATIONS

Int'l Application PCT/FR82/00,135 (WO83/00,538).

Primary Examiner—Edward K. Look
Assistant Examiner—James A. Larson
Attorney, Agent, or Firm—Schlesinger, Arkwright & Garvey

[57] ABSTRACT

A motor driven by a fluid motion, comprising a rotor with a vane whose surface varies according to the vane position relatively to the fluid flow direction. To create a thrust on the vane when the fluid moves quasi-parallel to the vane longitudinal axis, at least one side-panel is provided on the vane, generally perpendicular to the longitudinal axis thereof.

22 Claims, 10 Drawing Sheets

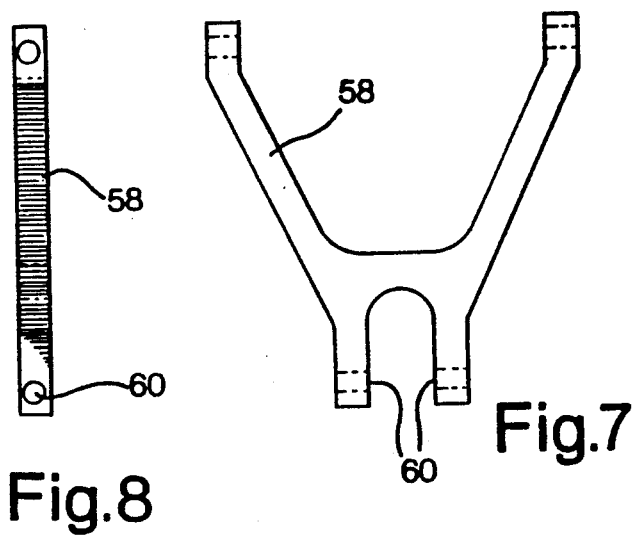
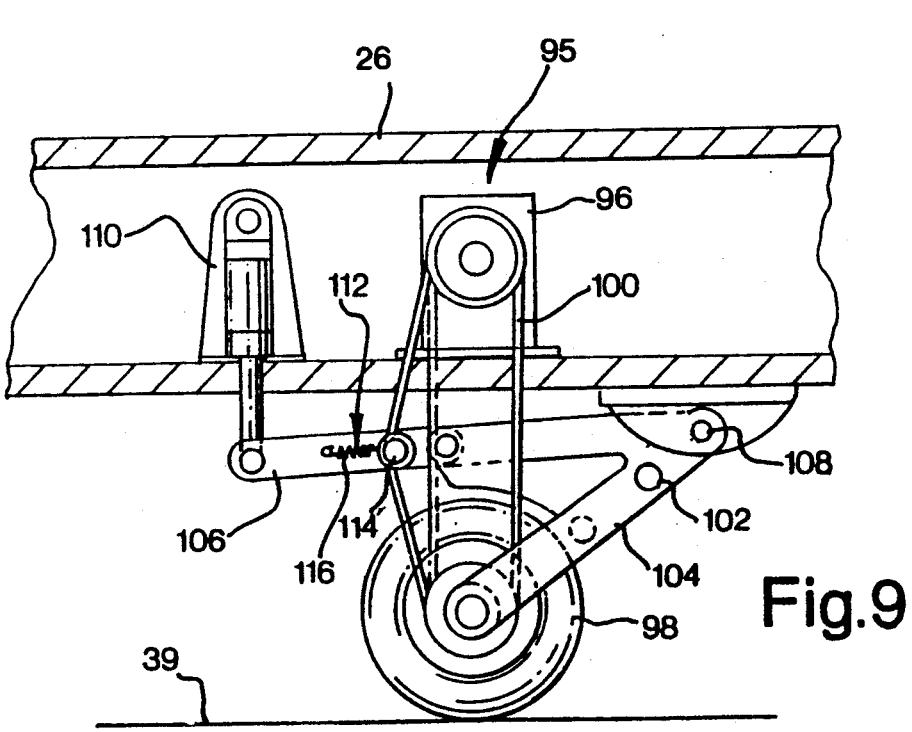

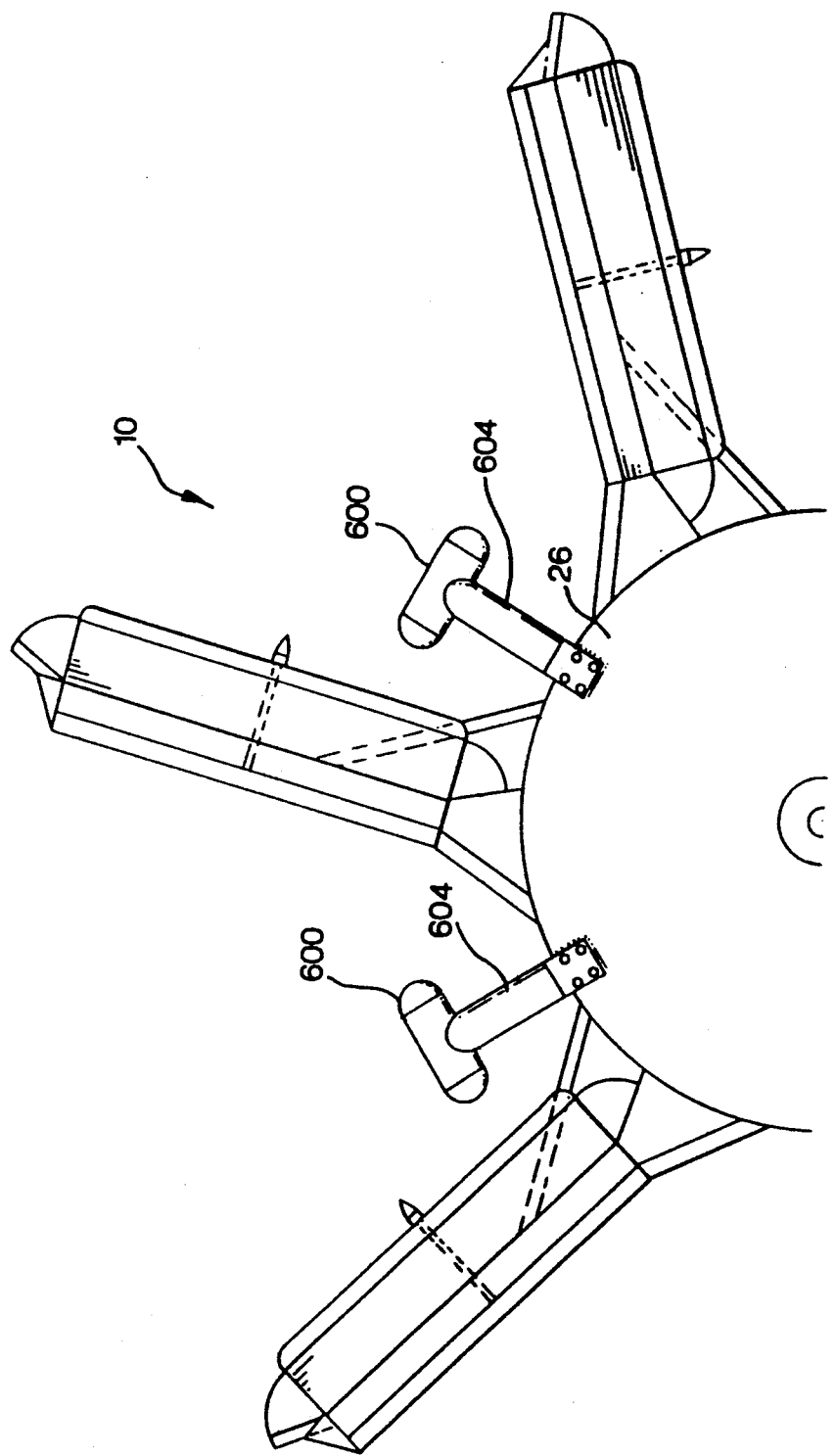

MOTOR

FIELD OF THE INVENTION

The present invention relates to a motor driven by the kinetic energy of a fluid such as air or water. The invention finds practical applications in the construction of wind-driven electric generators, hydraulic turbines or similar devices.

BACKGROUND OF THE INVENTION

The efficient conversion of the wind kinetic energy into mechanical or electrical energy presents technical problems which have not yet been solved in a satisfactory manner. Several types of wind-driven electrical generators have been designed and built in the past however, as a result of their low efficiency, they cannot substitute conventional means for mass-producing electricity such as hydroelectric, thermal or nuclear plants.

OBJECT AND STATEMENT OF THE INVENTION

An object of the invention is a motor driven by a kinetic energy of a fluid such as air or water, whose efficiency is superior to existing devices.

The motor according to the invention comprises a rotor to which is mounted at least one vane whose surface varies according to the position of the vane relatively to the flow direction of the driving fluid. More particularly, the vane comprises two main mobile panels which may be brought into a closed position in which they are in a generally face-to-face relationship lying generally parallel to the direction of fluid flow, and into an open position in which they are oriented generally transversally to the direction of fluid flow. With this system, when the vane moves in the direction of fluid flow, it is in the open position so that the fluid can produce a thrust on the rotor, the vane creating only a small reduced drag on the rotor while moving against the fluid because it is in the closed position and it has a substantially reduced surface.

Furthermore, the vane comprises at least one secondary panel which is mounted at an angle relatively to the longitudinal axis of the vane in order to produce a thrust on the vane when the fluid moves in a direction which is quasi-parallel to the vane longitudinal axis. In a preferred embodiment, two secondary panels are provided, mounted on either side of the assembly formed by the main panels, whereby the driving fluid creates a thrust on the vane when the fluid flows along an axis quasi-parallel to the longitudinal vane axis, in either direction of flow along said quasi-parallel axis.

In a preferred embodiment of the invention, the motor is provided with a certain number of auxiliary systems such as a braking system in order to immobilize the rotor or to reduce its speed, a system to synchronize the opening and the closing of the vane main panels, and actuation panels to initiate the opening movement of the vane main panels. Furthermore, one or more shock-absorbing devices are provided to limit shocks caused by violent opening or closing movements of the panels. In addition, counter-weights are provided on the latter in order to facilitate the vane opening and closing movements.

Preferably, adjustable stops are provided on the vanes in order to control the opening angle of the main panels. By limiting the opening angle of the main panels, the rotational speed of the motor can be reduced. The abutments adjustment is carried out by a hydraulic system.

Advantageously, another speed control system is provided in the form of a series of weights mounted to the rotor to increase its inertia in order to prevent sharp speed variations.

In summary, the invention can be defined in general terms as a fluid driven motor, comprising:

a rotor;

a vane mounted to the rotor for driving same as a result of thrust produced by driving fluid on the vane, the vane including:

a) a supporting structure;

b) a pair of main panels having adjacent longitudinal edges pivotally mounted to the supporting structure for movement between an opened and a closed position, in the opened position a substantially higher thrust being produced on the vane by the driving fluid than in the closed position; and c) a side panel mounted to the supporting structure and extending at a certain angle with respect to a longitudinal vane axis, the side panel constituting means to produce a thrust on the vane when the driving fluid flows in a direction generally parallel to the longitudinal vane axis.

BRIEF DESCRIPTION OF THE DRAWINGS

FIG. 7 is a top plan view of a component of the vane shown in FIG. 3;

FIG. 8 is a side elevational view of the component illustrated in FIG. 7;

FIG. 9 is a schematical view of a transmission for driving a hydraulic pump for use with the motor shown in FIG. 1;

FIG. 10 is a fragmentary top view of the motor according to a variant provided with inertia weights;

DESCRIPTION OF PREFERRED EMBODIMENTS

Figure 1:
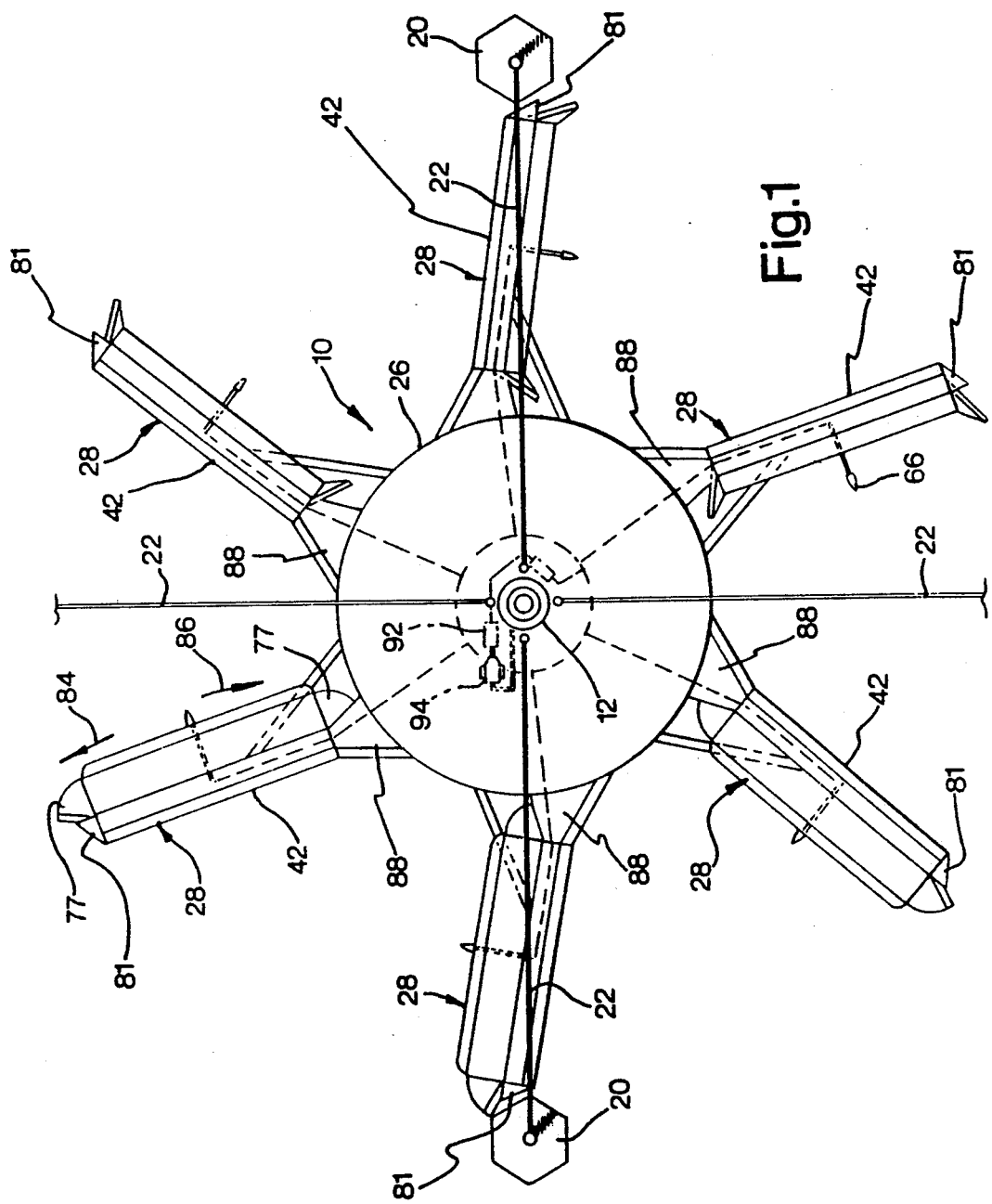
FIG. 1 is an elevational view of the motor according to the invention with vanes on the right side shown in the opened position.
Figure 2:
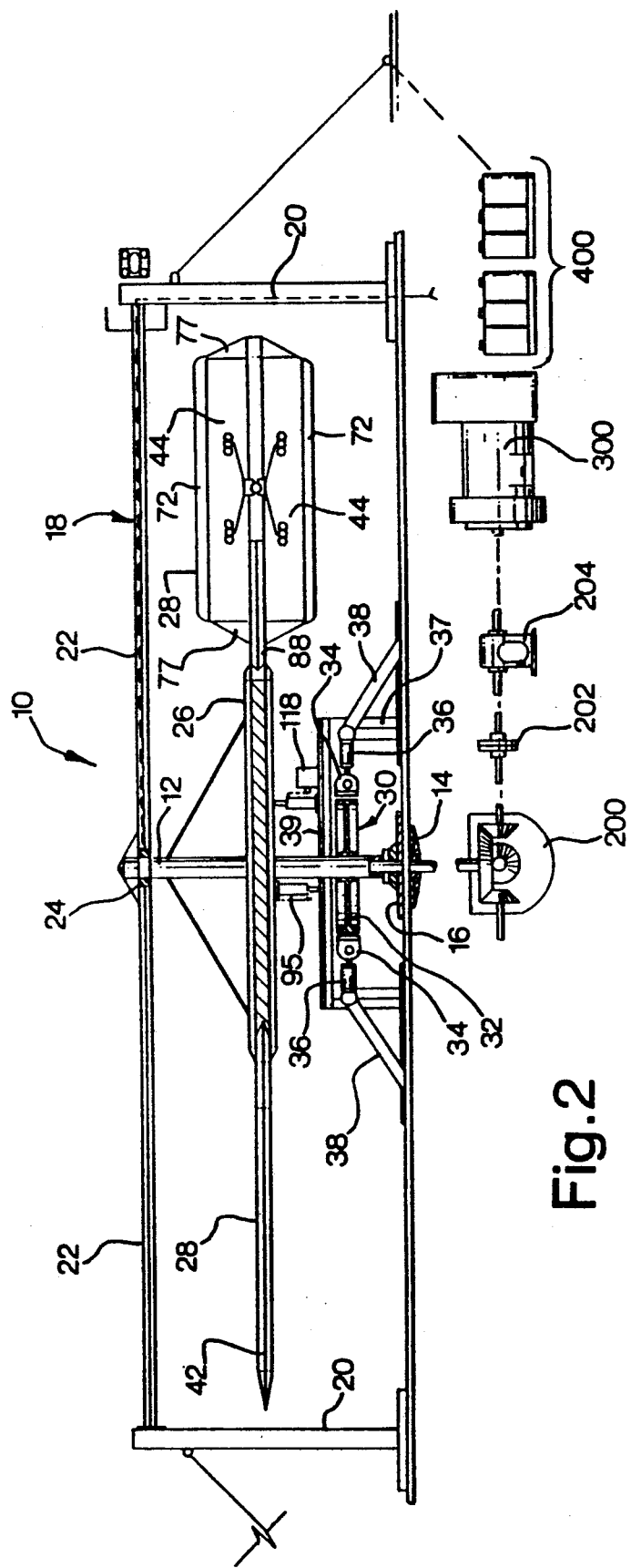
FIG. 2 is a vertical elevational view of the motor illustrated in FIG. 1, some elements being shown in cross-section and certain elements being omitted for clarity.

Referring now to FIGS. 1 and 2, the motor identified by the reference numeral 10 comprises a main rotor 12 whose lower extremity is mounted into a base 14 by means of a bearing 16 allowing the rotor to turn. The upper extremity of the rotor 12 is maintained in a proper position by a support system 18 constituted by an assembly of beams 20 and radial arms 22 carrying a bearing 24 receiving the rotor 12.

A main flywheel 26, of a generally circular shape, is mounted at mid-height between the extremities of the rotor 12. The flywheel 26 carries six vanes 28 for driving the motor.

To reduce the rotational speed of the rotor 12 or to fully immobilize it, a braking system 30 is provided mounted adjacent the base 14. The brake 30 comprises a disk 32 secured to the rotor and brake pads 34 that can be moved radially by respective hydraulic cylinders 36. These are mounted on respective supporting structures 38. The brake 30 is enclosed in a casing comprising a top surface 39 through Which extends the rotor 12.

Referring now to FIGS. 1, 2, 3 and 4, each vane 28 comprises a main member 88 connecting the vane to the flywheel 26, and a beam 40 having a generally circular cross-section to which are mounted the various components necessary for the operation of the vane. More specifically, the vane is provided at one of its extremities with a leading edge 42, generally conical in cross-section, to facilitate the penetration of the vane in the driving fluid, be it air or water. The leading edge 42 is a hollow structure for weight reduction purposes.

Two main panels 44 are mounted on the main beam adjacent the leading edge 42 by means of pivots 46. Each main panel 44 comprises a slightly concave surface 48 which is rigidified by a perforated member 50 which also constitutes a support for a counter-weight 52 designed to balance the panels 44 relatively to the pivots 46.

The movements of the main panels 44 are synchronized by a system 54 comprising a runner 56 which can slide on the beam 40, and from which extends two control arms 58 mounted to the respective main panels 44. The structure of each control arm 58 is illustrated in detail in FIGS. 7 and 8. Each arm has the shape of a Y provided with an opening 60 at its lower extremity to receive a pivot 62 which connects the arm with the runner 56. A similar articulation is provided at the upper extremity of the arm 58 in order to connect the arm with the respective main panel 44.

The travel of the runner 56 on the beam 40 is limited by two shock-absorbers 64 and 66, each being constituted by a coil spring extending around the beam 40. These coil springs allow to reduce the shocks when the runner 56 bumps up against the abutments during the opening and closing movements of the main panels 44.

Figure 5:
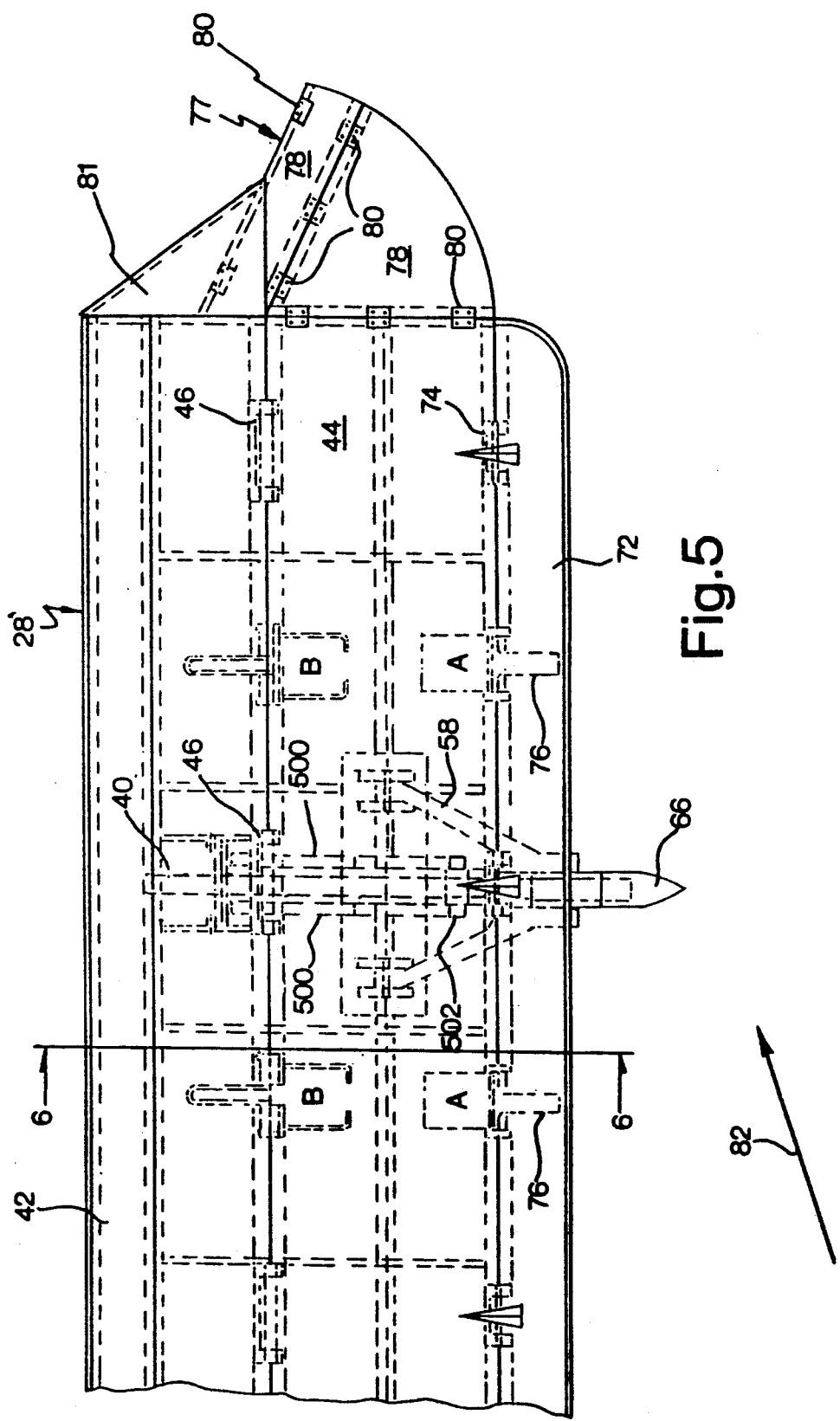
FIG. 5 is a fragmentary schematical view of a vane according to a variant.
Figure 6:
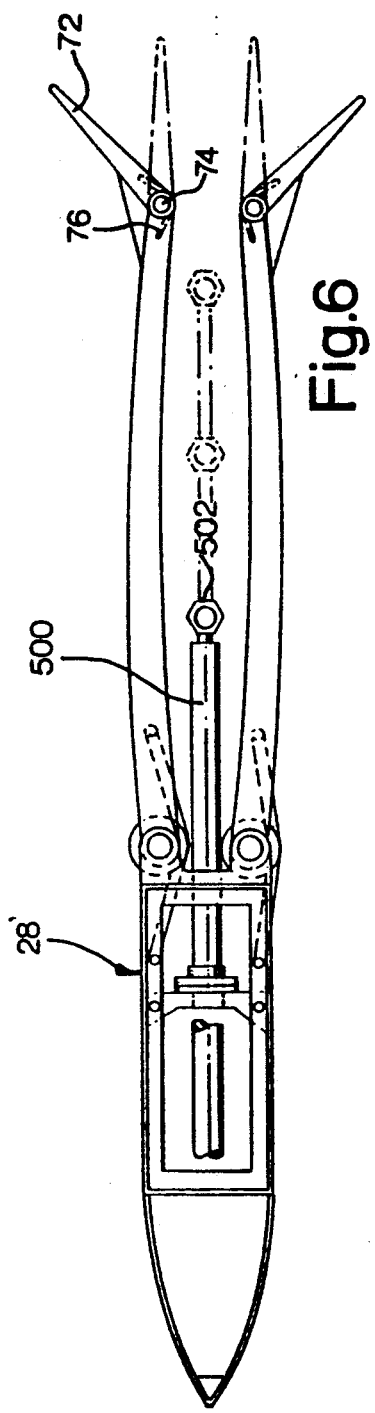
FIG. 6 is a sectional view along lines 6—6 in FIG. 5.
Figure 6A:
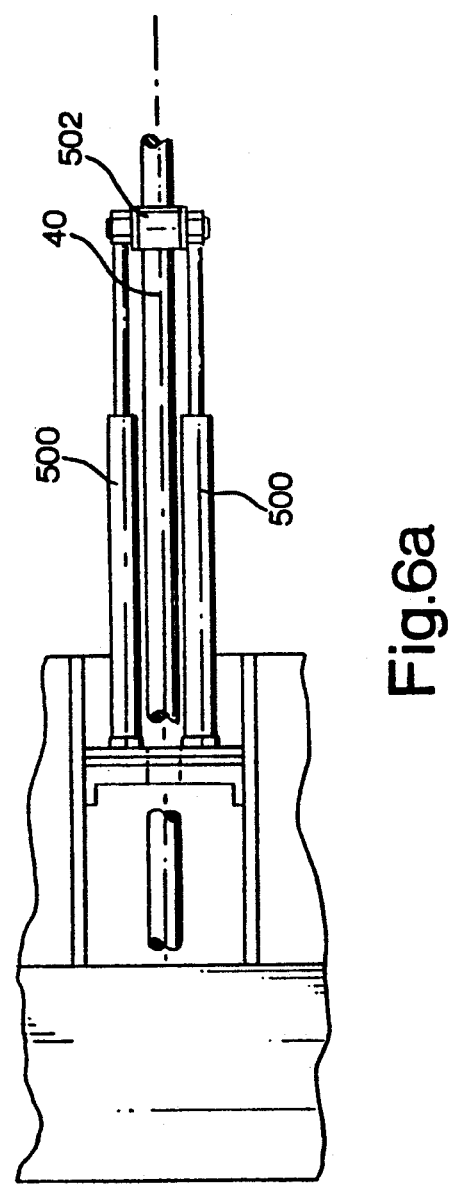
FIG. 6a is an enlarged fragmentary view of the vane of FIG. 6. illustrating an adjustable abutment to regulate the opening angle of the vane.

A variant of the vane is illustrated in FIGS. 5, 6 and 6a. More specifically, the vane 28'comprises two hydraulic cylinders 500 which move an abutment 502 on the beam 40 to adjust the maximum opening angle between the main panels 44. The closer the abutment 502 is positioned to the shock absorber 66 (not shown in FIGS. 6 and 6a) the more the opening angle between the panels 44 is reduced, and accordingly, the thrust exerted by the driving fluid on the vane is reduced. This device allows to control the rotational speed of the motor.

The opening movement of each main panel 44 is initiated by an actuation panel 72 mounted on the trailing edge of the panel 44 by a pivot 74. A spring 76 locates the actuation panel 72 at an obtuse angle relatively to the respective main panel 44. However, the actuation panel 72 may be brought in the plane of the main panel 44 against the force exerted by the spring, as illustrated with dashed lines in FIG. 6.

Figure 3:
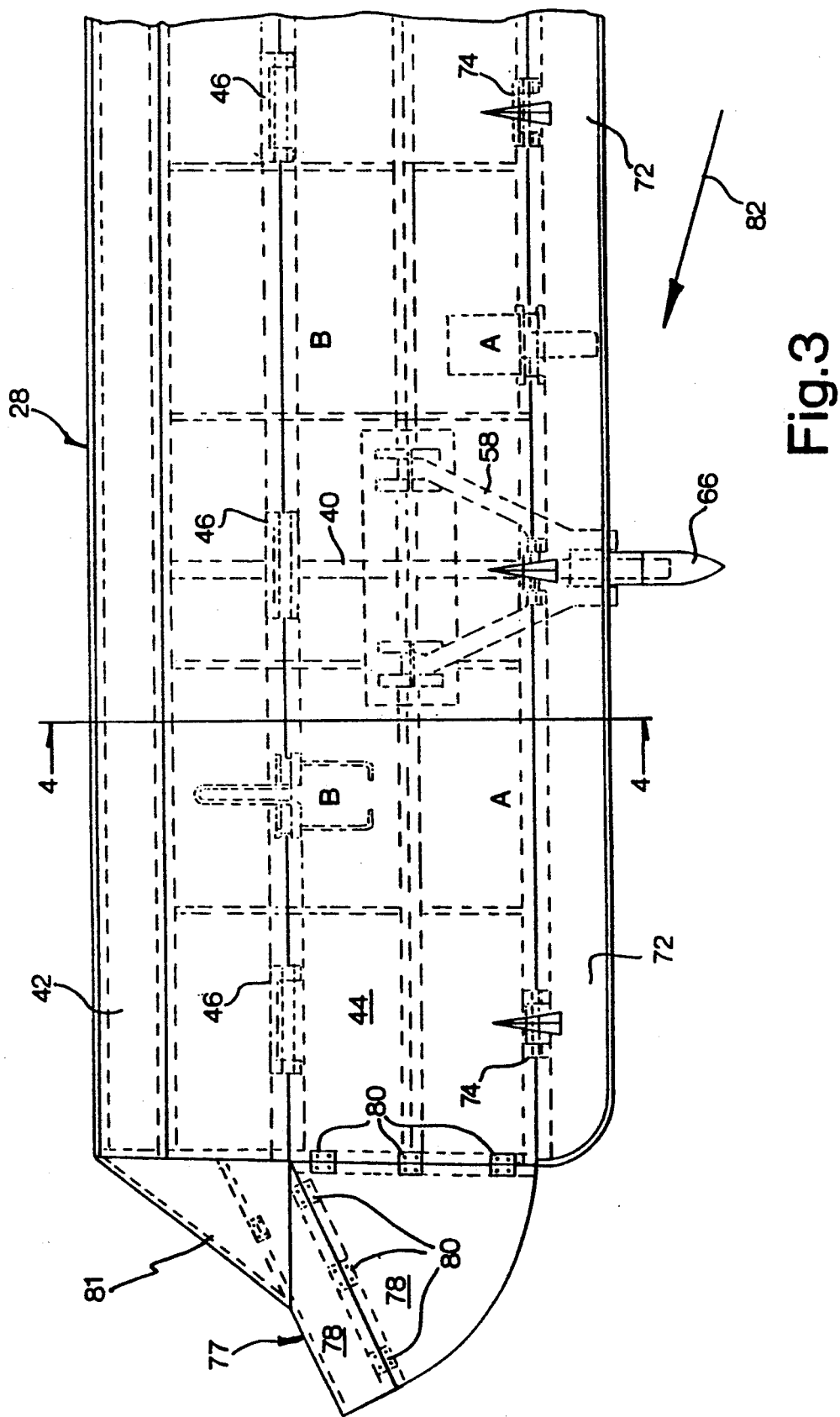
FIG. 3 is a schematical view of a portion of the vane and the lateral panels in the closed position of the motor shown in FIGS. 1 and 2.

Folding lateral panels 77 are mounted on either side of the structure formed by the main panels 44 so that the driving fluid will create a thrust on the vane when the direction of flow is quasi-parallel to the vane longitudinal axis. As shown in FIGS. 3 and 5, each lateral panel 77 is constituted by an assembly of plates 78, hingedly mounted to one another and to the respective main panel 44 by hinges 80. A partial cone structure 81 is secured to the leading edge 42 of the vane 28. The structure 81 is hollow and permits the lateral panels 77 to partially enter therein as illustrated by dash lines in FIG. 3.

Figure 4:
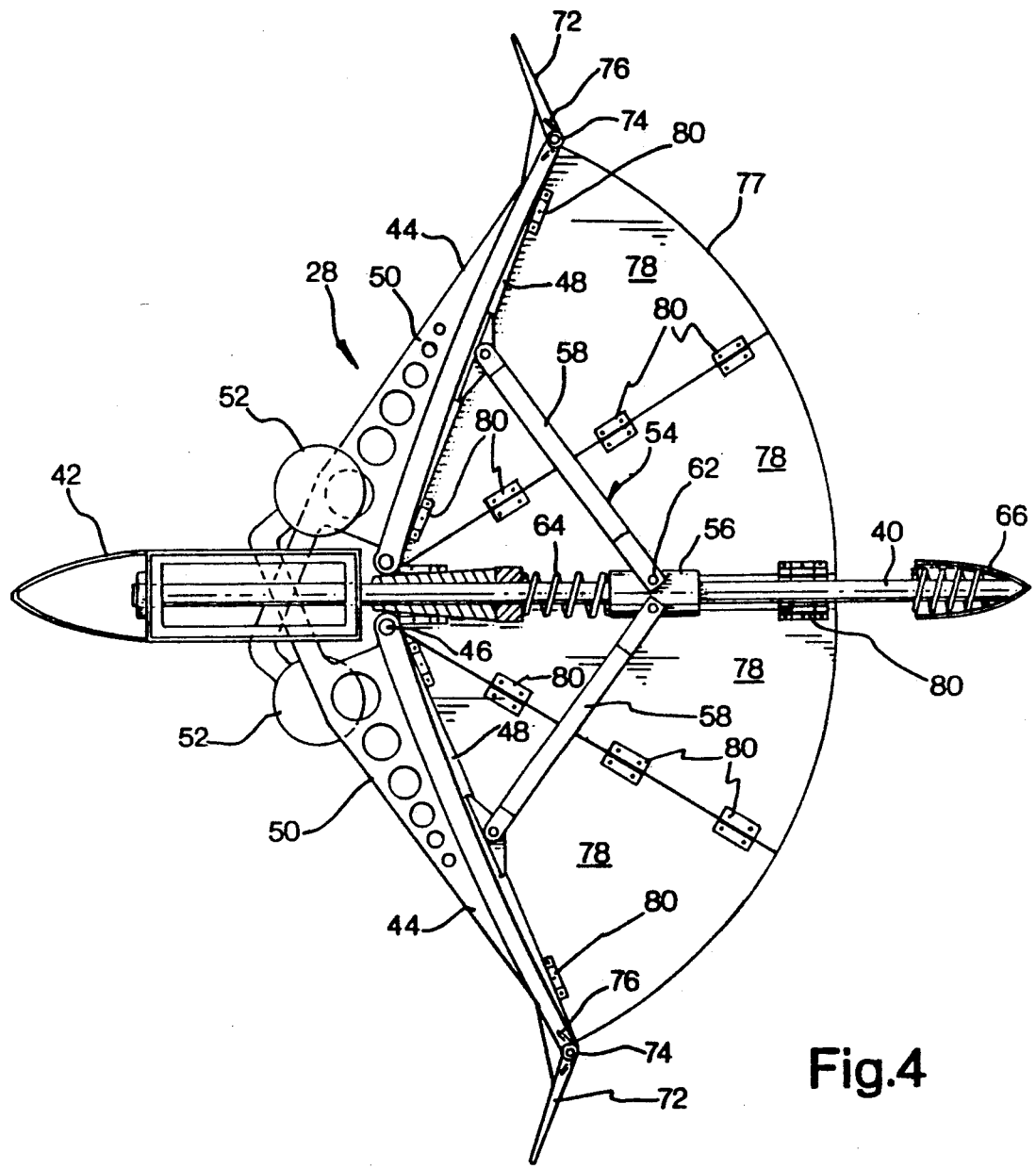
FIG. 4 is a sectional view taken along lines 4—4 in FIG. 3 showing the vane and the lateral panels in the opened position.

When the vane is in the open position, as shown in FIG. 4, the panels 77 are opened to present a surface oriented at an angle with respect to the longitudinal axis of the vane 28, which is close to 90°. Fluid, flowing in a direction identified by the arrow 82 in FIG. 3, will create a turbulence zone behind the lateral panel 77 and this turbulence zone will produce a thrust on the vane.

The lateral panels 77 are oriented in converging directions, as shown in FIG. 1, relatively to the direction of movement of the vane. Two panels 77 are provided to take advantage of each direction of movement of the driving fluid when the latter flows along an axis which is quasi-parallel to the vane longitudinal axis. More particularly, when the fluid flows in a direction identified by the arrow 84, the external side panels 77 will allow a thrust to be created so as to drive the rotor. If the fluid flows in the opposite direction, as shown by the arrow 86, the internal side panel 77 will permit this thrust to be achieved.

Referring to FIGS. 1 and 2, when the vanes of the motor 10 are constructed according to the variant shown in FIGS. 6 and 6a, the hydraulic cylinders 500 are supplied with pressurized fluid by a pump 92 driven by an electric motor 94 when the motor 10 is not running. The hydraulic lines between these components are identified with dotted lines in FIG. 1. The pump 92 and the motor 94 are mounted within the flywheel 26. The electrical connections for the motor 94 have not been shown as they are of conventional nature.

The supply of pressurized operating fluid is achieved when the motor 10 is in operation by a mechanical system 95 of the type illustrated schematically in FIG. 9. This system comprises a pump 96 mounted inwardly of the main flywheel 26 and driven by a wheel 98 riding on the surface 39 through and a belt 100. The wheel 98 is mounted on the flywheel 26 by a mobile structure 102 provided with arms 104 and 106 united to a pivot 108 connected to the main flywheel 26. The other extremity of the arms 104 and 106 is connected respectively by pivots at the spindle of the wheel 98 and at the extendable piston rod of a hydraulic cylinder 110. A tensioner 112 comprising a roller 114 mounted at the extremity of a spring 116 is mounted on the arm 106. The purpose of the tensioner 112 is to maintain a certain tension in the belt 100 during the vertical movement of the wheel 98 produced by the hydraulic cylinder 110.

The pump 96 is connected by lines (not illustrated) to cylinders 500 of the vanes 28'.

The pressurized fluid to operate the hydraulic braking cylinders 36, is produced by a pump 118 (shown in FIG. 1) having a similar structure to the system 95, except that the system 118 is fixed on the surface 39, the pump driving wheel riding on the flywheel 26.

Figure 11:
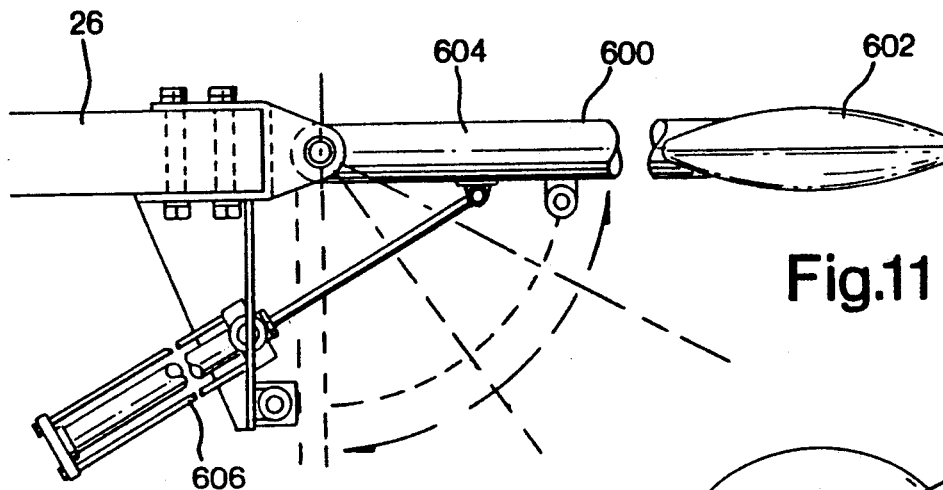
FIG. 11 is an enlarged side view illustrating in detail the structure of each inertia weight.
Figure 12:
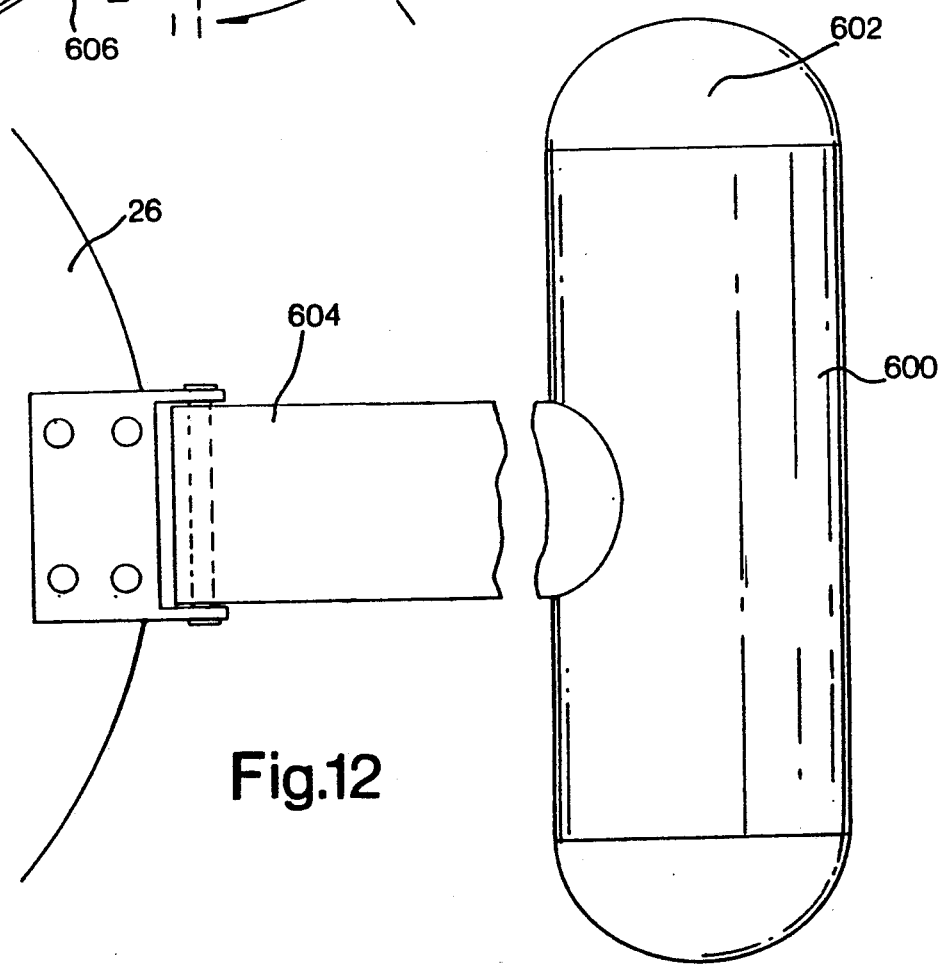
FIG. 12 is a top plan view of an inertia weight.

A further variant of the motor 10 is illustrated in FIGS. 10, 11 and 12. On the flywheel 26 are articulated a series of weights 600 which serve to increase the inertia of the rotor 12 and consequently, to stabilize its speed. More particularly, each weight 600 comprises a weight 602 pivotally mounted to the flywheel 26 by an arm 604. Each weight 602 is elongated with rounded edges to facilitate its penetration in the driving fluid during the rotation of the rotor 12. Each arm 604 is connected to the flywheel 26 by a shock absorber 606 of a known construction designed to offer little resistance during the rise of the arm and a higher resistance during the downward movement of the arm to limit shocks of the weight 602 against the flywheel 26 in case of a sudden stop of the rotor 12. The operation of the motor 12 is as follows. The start-up procedure consists of releasing the braking system 30 and retracting the stops 502, when using the vane shown in FIGS. 6 and 6a, in order to obtain the maximum opening angle between the main panels 44. Pressurized fluid to carry out this operation is generated by the pump 92 driven by the electric motor 94.

The driving fluid, be it air or water for example, will create a thrust on the vanes in order to drive the motor 10 in the predetermined direction. More particularly fluid pressure created on the actuation panels 72 will have the effect of initiating the opening of the main panels 44 as illustrated in FIG. 4. In this position, the vane 28 presents a wide surface to the driving fluid so that a considerable amount of torque may be transmitted to the flywheel 26. The side panels 77 contribute to achieve a thrust on the vane when the vane reaches a position in which the driving fluid flows in an axis quasi-parallel to the vane longitudinal axis. Passed a certain angular position from which the vane initiates a return movement against the direction of flow of the driving fluid. The closing fluid pressure exerted on the main panels 44 will bring them against one another as in the position shown in FIG. 6. In this position, the actuation panels 72 will be extended by the fluid pressure in the respective planes of the main panels 44 (as illustrated in dashed lines) so that the vane will create only a reduced drag.

When the motor 10 has reached a predetermined speed, the abutment 502 is extended to limit the opening angle of the main panels 44 therefore, reducing the vane surface and consequently the motor speed.

When the motor is in operation, the pumping system 95 supplies the pressurized fluid necessary for the operation of the hydraulic cylinders 500. In the active mode, the arm of the hydraulic cylinder 110 is extended to maintain the wheel 98 in contact with the surface 39. The rotation of the wheel 98 drives the pump 96 by means of the belt 100. In order to deactivate the system 95, a control device of a conventional type (non-illustrated) will retract the piston rod of the cylinder 110 which will place the wheel 98 out of operative relationship from the surface 39.

The motor 10 may he used to drive various loads such as an electrical generator, a pump or another similar device. FIG. 2 illustrates schematically a transmission which may be used to drive an electrical generator. A gear set 200 is provided driven by the rotor 12 and coupled to a generator 300 by a clutch 202 through a reducer 204. The generator 300 produces current in the utility grid (not illustrated), through a series of batteries 400 which power the electrical motor 94 during the start-up of the motor 10.

Figure 13:
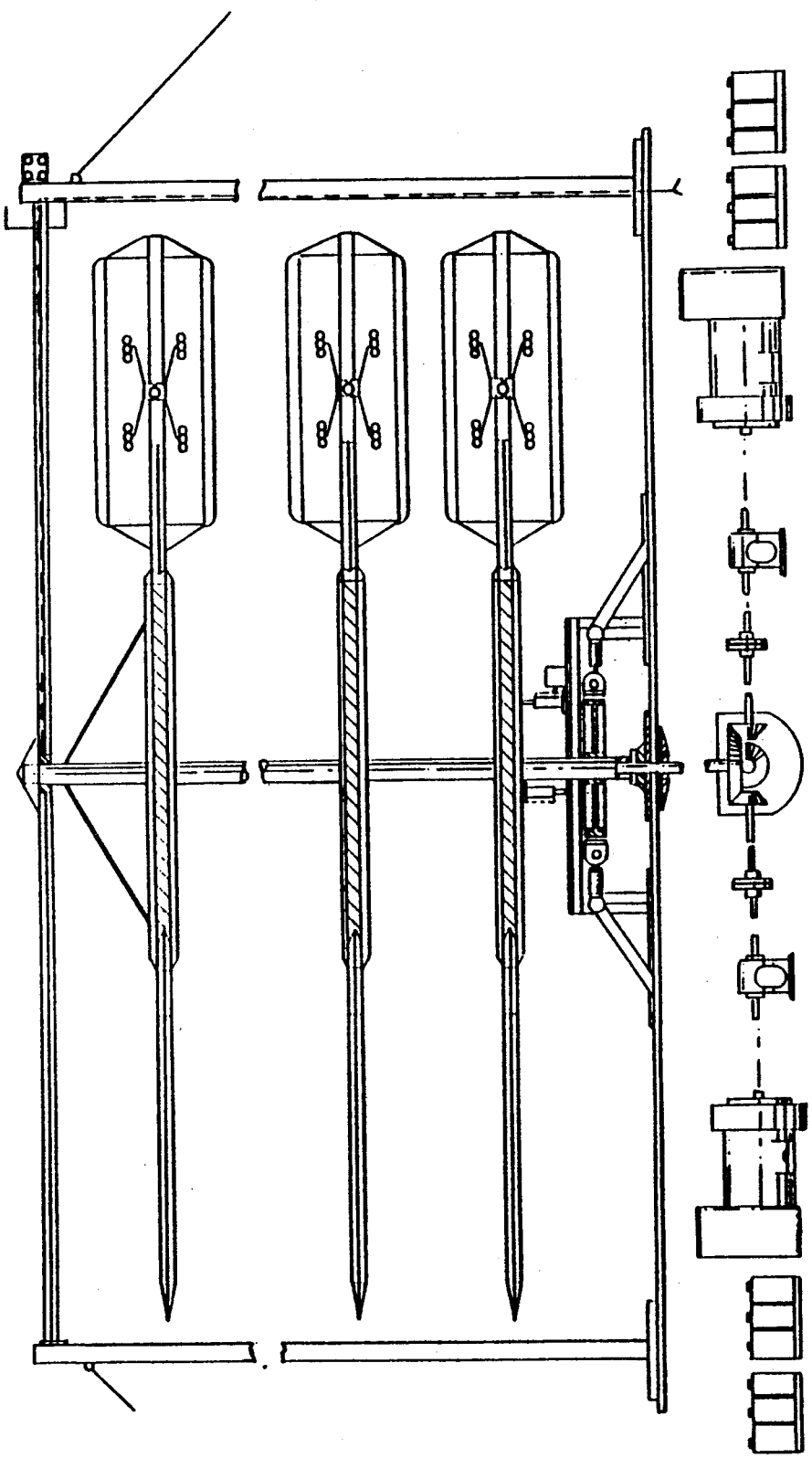
FIG. 13 is an elevational view of the motor according to a further variant.

It will be evident to those skilled in the art that the output of the motor 10 may be increased by providing on the rotor 12 a plurality of vane assemblies mounted on respective flywheels. An embodiment of such a variant is schematically shown in FIG. 13.

The motor may be driven by the wind for example, in which case it will be installed preferably at the higher location in order to benefit from quasi-constant wind currents in altitude. Evidently, it may also be envisaged to utilize water to drive the motor. In the latter case, the installation will vary according to the applications.

I claim:
1. A fluid driven motor, comprising:
 a) a rotor;
 b) a vane in a spaced apart relationship with said rotor and connected thereto, said vane including:
  i) a pair of main panels having adjacent longitudinal edges, said main panels being pivotable along said longitudinal edges between opened and closed positions, in said opened position said panels extending away from each other and in said closed position said panels being generally in a face-to-face relationship, said main panel in said opened position generating thrust from a driving fluid, thereby driving said rotor;
  ii) a side panel disposed at each longitudinal extremity of said main panels, each side panel extending at an angle with respect to a longitudinal axis of said main panels, said side panels generating thrust from a driving fluid flowing in a direction generally parallel to the longitudinal axis of said main panels.

2. A motor as defined in claim 1, wherein said side panels converge toward each other in the direction of rotation of said rotor.

3. A motor as in claim 2, wherein:
 a) each of said side panels is a folding structure mounted to said main panels such that each of said side panels is opened when said main panels are in said opened position and closed when said main panels are in said closed position.

4. A motor as in claim 1, and further comprising:
 a) means for synchronizing said main panels to move simultaneously when moving between said opened and closed positions.

5. A motor as in claim 4, wherein
 a) an elongated rod extending between said main panels
 b) a runner slidingly mounted to said rod; and
 c) an arm pivotally mounted to each of said main panels and to said runner such that the movement of said main panels between said opened and closed positions is synchronized.

6. A motor as in claim 5, and further comprising:
 a) means connected to said rod for absorbing shocks from said runner when said main panels move between said opened and closed positions.

7. A motor as in claim 5, and further comprising:
 a) an abutment slidingly mounted on said rod for adjusting the travel of said runner, thereby controlling the angle defined between said main panels in said opened position.

8. A motor as in claim 7, and further comprising:
 a) piston-cylinder assembly for sliding said abutment on said rod.

9. A fluid driven motor, comprising:
 a) a rotor;

b) a vane in a spaced apart relationship with said rotor and being connected thereto, said vane including:
  i) a pair of main panels having adjacent longitudinal edges, said main panels being pivotable along said longitudinal edges between opened and closed positions, in said opened position said panels extending away from each other and in said closed position said panels being generally in a face-to-face relationship, said main panel in said opened position generating thrust from a driving fluid, thereby driving said rotor;
  ii) a side panel disposed at each longitudinal extremity of said main panels, each side panel extending at an angle with respect to a longitudinal axis of said main panels, said side panels generating thrust from a driving fluid flowing in a direction generally parallel to the longitudinal axis of said main panels;
  iii) said main panel having trailing edges, actuation panel mounted to said trailing edges of respective main panels for assisting movement of said main panels to said opened position.

10. A motor as in claim 9, wherein:
a) said actuation panels are pivotally mounted to the respective main panels.

11. A motor as in claim 10, and further comprising:
a) resilient means for urging said actuation panels at an obtuse angle with respect to said main panels.

12. A vane for a fluid driven motor which includes a rotor, said vane comprising:
  i) a pair of main panels having adjacent longitudinal edges, said main panels being pivotable along said longitudinal edges between opened and closed positions, in said opened position said panels extending away from each other and in said closed position said panels being generally in a face-to-face relationship, said main panels in said opened position generating thrust from a driving fluid;
  ii) a side panel disposed at each longitudinal extremity of said main panels, each side panel extending at an angle with respect to a longitudinal axis of said main panels, said side panels generating thrust from a driving fluid flowing in a direction generally parallel to the longitudinal axis of said main panels.

13. A vane as in claim 12, wherein:
a) said side panels converge toward each other in the direction of rotation of said rotor.

14. A vane as in claim 13, wherein:
a) each of said side panels is a folding structure mounted to said main panels such that each of said side panels is opened when said main panels are in said opened position and closed when said main panels are in said closed position.

15. A vane as in claim 12, and further comprising:
a) means for synchronizing said main panels to move simultaneously when moving between said opened and closed positions.

16. A vane as in claim 15, further comprising:
a) an elongated rod extending between said main panels;
b) a runner slidingly mounted to said rod; and
c) an arm pivotally mounted to each of said main panels and to said runner such that the movement of said main panels between said opened and closed positions is synchronized.

17. A vane as in claim 16, further comprising:
a) means connected to said rod for absorbing shocks from said runner when said main panels move between said opened and closed positions.

18. A vane as in claim 16, further comprising:
a) an abutment slidingly mounted on said rod for adjusting the travel of said runner, thereby controlling the angle defined between said main panels in said opened position.

19. A vane as in claim 18, further comprising:
a) piston-cylinder assembly for sliding said abutment on said rod.

20. A vane for a fluid driven motor including a rotor, said vane comprising:
a) a pair of main panels having adjacent longitudinal edges, said main panels being pivotable along said longitudinal edges for movement between opened and closed positions:
b) said main panels in said opened position generating thrust from a driving fluid,
c) said main panels including trailing edges;
d) actuation panels mounted to said trailing edges of respective main panels for assisting movement of said main panels to said opened positions;
e) a side panel mounted to said supporting structure and extending at an angle with respect to a longitudinal axis of said main panels; and
f) said side panel generating thrust from a driving fluid flowing in a direction generally parallel to the longitudinal axis of said main panels.

21. A vane as in claim 20, wherein:
a) said actuation panels are pivotally mounted to the respective main panels.

22. A vane as in claim 21, further comprising:
a) resilient means for urging said actuation panels at an obtuse angle with respect to said main panels.

* * * * *